United States Patent Office 3,280,050
Patented Oct. 18, 1966

3,280,050
EMULSION PAINT COMPRISING: PIGMENT, BINDER, COLLOIDAL THICKENER AND ZIRCONYL CARBONATE COMPLEX
Thomas E. Johnson, Hale, near Liverpool, England, assignor to John Mathews & Co. Limited, Liverpool, and Hardman & Holden Limited, Manchester, England, both companies of Great Britain
No Drawing. Filed Aug. 19, 1963, Ser. No. 303,159
Claims priority, application Great Britain, Aug. 22, 1962, 32,194/62
6 Claims. (Cl. 260—17)

This invention relates to emulsion compositions and paints.

Emulsion paints usually consist of (1) a binder such as plasticised polyvinyl acetate in the form of a dispersion in water, (2) a pigment or mixture of pigments and extenders, (3) an aqueous solution of a colloid (or thickening agent) with or without a surface active agent, (4) small amounts of compounds which act as fungicides, bactericides, foam suppressants, corrosion inhibitors, film coalescing agents etc.

Such paints are either liquid or semi-liquid. If the latter they are usually further thinned with water prior to application and in order to render application easy. These paints sometimes show a tendency for the pigment to settle to the bottom of the tin and stirring before use is usually advisable. Paints of such fluidity have certain disadvantages during application, viz they can be easily spilt. Also during transference by brush to the surface to be painted the paint often drips and splashes. Furthermore and particularly during the painting of ceilings where emulsion paint is largely used, such paints often run down the handle of the brush and the side of the container.

A thixotropic paint possesses none of these disadvantages. In the can it behaves and looks like a solid and is therefore non-spillable if accidentally knocked over. Since the paint is in the form of a gel the pigment present does not show any tendency to settle during storage and therefore stirring of the paint before use is neither necessary nor desirable. Furthermore during application by brush, the brush will carry on and in its bristles considerably more paint than a conventional liquid paint thus speeding up of the painting process. At this stage a thixotropic paint retains its gel structure and thus no dripping, splashing or running occurs; hence application is both faster and cleaner. During the brushing out of the paint the gel structure is sheared out by the action of brushing and the viscosity of the paint falls to equal that of a conventional liquid paint. Hence the paint spreads as easily and flows out as well as a liquid emulsion paint.

The object of the present invention is to provide emulsion paints in thixotropic form.

According to the invention, a thixotropic emulsion paint comprises a binder in the form of a dispersion in water, a pigment or mixture of pigments, an aqueous solution of a colloid, and a complex of zirconium with two or more organic acids.

Preferably the zirconium complex comprises a minor proportion of one or more non-volatile acids and a major proportion of one or more volatile acids, and is used in the form of a liquid containing also water and a water-soluble oxygen-containing organic solvent, both of which may be associated to some extent with the zirconium.

The complexes may be prepared by treating zirconyl carbonate paste with a volatile acid or acids, heating, adding one or more non-volatile acids in an alcoholic solvent, stirring for a short time, cooling and filtering.

Examples of complexes suitable for use in this invention are:

Zircomplex C, made from:
    4 mols zirconyl carbonate
    16 mols acetic acid
    2 mols coconut oil fatty acids
    isopropyl alcohol Zircomplex T, made from:
    4 mols zirconyl carbonate
    16 mols acetic acid
    1 mol coconut oil fatty acids
    isopropyl alcohol Zircomplex G, made from:
    1 mol zirconyl carbonate
    3 mols acetic acid
    1 mol methacrylic acid
    isopropyl alcohol The pigment may be white or coloured or a mixture of both as for example titanium dioxide (e.g. Tioxide R–CR) and for example a natural red iron oxide. Synthetically produced coloured pigments may also be used. The extenders may be blanc fixe, Paris white, china clay or many of the usual extenders used in paint. The surface active agent is employed to aid the dispersion of the pigment in water and may be anionic or non-ionic or a mixture of these. For example an anionic type may be sodium hexametaphosphate ("Calgon") whilst a non-ionic type may be an alkylated phenol-ethylene oxide condensate ("Lissapol NX").

The colloid thickening agent may be a cellulose either such as methyl cellulose, sodium carboxy methyl cellulose, hydroxy ethyl cellulose, ethyl hydroxy ethyl cellulose or hydroxy propyl methyl cellulose, or it may be a starch ether or polyvinyl alcohol or mixtures of any of these. The water content of emulsion paint usually ranges between 40% and 60% and we prefer the colloid to be present in quantity between 0.5 and 10% on the total water content of the paint, i. e. from 0.2% to 6% of the weight of the paint.

The pigment dispersion may be blended with an aqueous dispersion of a synthetic resin which may be a homopolymer or a copolymer of one or more of the following monomers:

Vinyl acetate, propionate and higher esters such as vinyl caprate;
Vinyl chloride, vinylidene chloride;
Methyl, ethyl and higher esters of acrylic acid and methacrylic acid;
Styrene and vinyl toluene;
Butadiene;

Dibutyl, dioctyl and other esters of maleic and fumaric acids may be used in conjunction with such monomers as vinyl acetate, methacrylic esters and styrene for the purpose of modifying flexibility and melting point by internal plasticisation.

These polymer or copolymer dispersions may be further modified, if desired, by the addition of external plasticisers commonly used for the purpose and including, for example, dibutyl phthalate, dioctyl phthalate and esters of sebacic acid.

After blending the aqueous pigment dispersion with the aqueous resin dispersion we may then add minor additives such as foam suppressants, fungicides etc. After this we may then add the zirconium complex slowly with continuous stirring. The amount of zirconium complex may be from ½ to 10 times the weight of the colloid.

Depending on the type of colloid and the type of zirconium complex present a gel is formed either almost immediately or after standing a few hours.

Alternatively we may prefer to add the zirconium complex to an aqueous dispersion of the colloid thickening agent before incorporation of the pigment or the resin dispersion, or again it may be added at any intermediate stage of the paint making process.

The acidity liberated by the addition of the zirconium complex is preferably neutralised by the addition of an alkali such as ammonia or morpholine or other alkaline substance.

The invention is illustrated by the following examples in which all parts are by weight.

Example 1

420 parts of rutile titanium dioxide ("Tioxide R–CR") was mixed with 572 parts of water containing 0.21 part of sodium hexametaphosphate ("Calgon") and 8.9 parts of methyl cellulose ("Celacol"). After thorough dispersion, 790 parts of a vinyl acetate homopolymer plasticised wtih dibutyl phthalate ("Vandike 1115") was added and stirred together.

To this was then added with stirring 32 parts of a film coalescing agent—butyl Carbitol acetate. To the final mixture was added 22.4 parts of a zirconium complex ("Zircomplex T") with continual stirring. The product rapidly thickened and eventually set to a firm gel.

Example 2

420 parts of rutile titanium dioxide ("Tioxide R–CR") and 390 parts of finely powdered mica were mixed with 905 parts of water containing 0.8 part of sodium hexametaphosphate ("Calgon") and 11 parts of methyl cellulose ("Celacol"). After thorough dispersion 492 parts of a vinyl acetate homopolymer plasticised with dibutyl phthalate ("Vandike 1115") was added and stirred together. To this was added 2.9 parts of a mercurial fungicide ("Nuodex 321 extra"). To the final mixture was added 54 parts of a zirconium complex ("Zircomplex T") with continual stirring. The product thickened rapidly and eventually set to a firm gel.

Example 3

315 parts of rutile titanium dioxide ("Tioxide R–CR"), 117 parts of Paris white and 4 parts of a natural red iron oxide were mixed with 360 parts of water containing 1.25 parts of a dispersing agent ("Oratan 731"), 1.2 parts of an alkylated phenol ethylene oxide condensate ("Lissapol NX") and 2.6 parts of hydroxy ethyl cellulose ("Cellosize"). After thorough dispersion 380 parts of a vinyl acetate copolymer ("Vandike 3015") was added and stirred together. To this was added 3.5 parts of a foam suppressant ("Bevaloid 677") and to the mixture was then added with stirring 26.4 parts of a zirconium complex ("Zircomplex C") followed by 6.6 parts of 0.880 ammonia. The product thickened rapidly and eventually set to firm gel.

Example 4

282 parts of rutile titanium dioxide ("Tioxide R–CR"), 206 parts of blanc fixe, and 21 parts of china clay were mixed with 561 parts of water containing 0.55 part of sodium hexametaphosphate ("Calgon") and 3.2 parts of an aqueous solution of sodium polymethacrylate ("Vinapol 1660") and 7.3 parts of hydroxy propyl methyl cellulose ("Methofas"). After thorough dispersion 382 parts of a vinyl acetate-vinyl caprate copolymer ("Vinamul N 6520") was added and stirred together. To this was added 11 parts of a film coalescing agent—hexylene glycol—and to the mixture was then added with stirring 18.5 parts of a zirconium complex ("Zircomplex G"). The product thickened rapidly to a firm gel.

Example 5

210 parts of rutile titanium dioxide ("Runa RH 20"), 93 parts of blanc fixe, and 29 parts of finely ground mica were mixed with 244 parts of water containing 2.9 parts of ethyl hydroxy ethyl cellulose ("Modocoll"). After thorough dispersion 288 parts of a vinyl acetate copolymer ("Epok V.750") was added and stirred together. To this was added 2 parts of a mercurial fungicide ("Nuodex 321 extra") followed by 14 parts of a zirconium complex ("Zircomplex T") with constant stirring. 5 parts of an aqueous dispersion of an organic yellow pigment ("Irgalite SPV 4 Yellow") was then stirred in. The resultant yellow paint set to a firm gel.

Example 6

185 parts of rutile titanium dioxide ("Runa RH 20"), 62 parts of blanc fixe and 8 parts of finely ground silica were mixed with 244 parts of water containing 0.25 part of sodium hexametaphosphate ("Calgon") and 20 parts of polyvinyl alcohol ("Alcotex"). After thorough dispersion 277 parts of a vinyl acetate homopolymer plasticised with dibutyl phthalate ("Vinamul N 8814") was added and stirred together. 45 parts of a zirconium complex ("Zircomplex G") was then added with stirring, followed by 11 parts of 0.880 ammonia. The product thickened rapidly to a firm gel.

Example 7

210 parts of rutile titanium dioxide ("Runa RH 20") and 52 parts of talc were mixed with 288 parts of water containing 0.25 part of sodium hexametaphosphate ("Calgon") and 40 parts of a starch ether ("Solvitose"). After thorough dispersion 266 parts of a polyvinyl acetate homopolymer plasticised with dibutyl phthalate ("Emultex DS 6404") was added and stirred together. To this was added 7.8 parts of a film coalescing agent—butyl Carbitol acetate—followed by 20 parts of zirconium complex ("Zircomplex C"). The mixture thickened and set to a firm gel.

Example 8

192 parts of anatase titanium dioxide ("Tioxide A–LF") and 97 parts of china clay were mixed with 454 parts of water containing 0.6 part of an alkylated phenol ethylene oxide condensate ("Lissapol NX") and 7.4 parts of ethyl hydroxy ethyl cellulose ("Modocoll").

After thorough dispersion 210 parts of a vinyl acetate/acrylic copolymer ("Emultex Beta AC 23") was added and stirred together. To this was added 2.7 parts of a foam suppressant ("Troykyd 333") followed by 22.4 parts of a zirconium complex ("Zircomplex T") with continual stirring. The mixture thickened rapidly and eventually set to a firm gel.

Example 9

5.7 parts of hydroxy ethyl cellulose ("Cellosize") were dissolved in 225 parts of water. To this was added 17 parts of Zircomplex "T" and 7 parts of morpholine. This was then mixed with 252 parts of rutile titanium dioxide ("Tioxide R–CR") and 45 parts of blanc fixe together with 1 part of a 10% solution of sodium hexametaphosphate ("Calgon"). After dispersion, 319 parts of a styrene butadiene latex solution ("Dow Latex 762 W") was added. The product eventually set to a firm gel.

Example 10

504 parts of rutile titanium dioxide ("Tioxide R–CR") and 91 parts of blanc fixe were mixed with 600 parts of water containing 1.49 parts of a dispersing agent ("Oratan 731") and 9 parts of hydroxy ethyl cellulose ("Cellosize"). After thorough dispersion, 18 parts of Zircomplex "G" was added, followed by 7 parts 0.880 ammonia, and then followed by 616 parts of an acrylic resin emulsion ("Primal AC 55"). The product eventually set to a firm gel.

What is claimed is:

1. A thixotropic emulsion paint, comprising a binder in the form of an aqueous dispersion of a resinous polymer of an ethylenically unsaturated compound, at least one pigment, an aqueous solution of a colloid thickening agent selected from the group consisting of cellulose ethers, starch ethers and polyvinyl alcohol, and a complex formed from zirconyl carbonate and at least two carboxylic acids of different volatilities.

2. A paint as claimed in claim 1, in which the zirconium complex contains a minor proportion of at least one non-volatile carboxylic acid, a major proportion of at least one volatile carboxylic acid, water and a water-soluble alcoholic solvent.

3. A paint as claimed in claim 1, in which the zirconium complex contains a minor proportion of methacrylic acid, a major proportion of acetic acid, water and isopropyl alcohol.

4. A paint as claimed in claim 1, in which the zirconium complex contains a minor proportion of cocoanut oil fatty acids, a major proportion of acetic acid, water and isopropyl alcohol.

5. A paint as claimed in claim 1, in which the zirconium complex is obtained by treating zirconyl carbonate paste with at least one volatile carboxylic acid, heating, adding at least one non-volatile carboxylic acid together with water and a water-soluble alcohol, stirring and cooling.

6. A paint as claimed in claim 1, in which the proportion of colloid thickening agent present is from 0.2% to 6% by weight, and the amount of zirconium complex is from 0.1% to 60%.

References Cited by the Examiner
UNITED STATES PATENTS
2,758,102   8/1956   Grummitt et al. _____ 260—29.6

WILLIAM H. SHORT, *Primary Examiner.*

J. NORRIS, *Assistant Examiner.*